Patented Jan. 26, 1937

2,068,772

UNITED STATES PATENT OFFICE 2,068,772

PROCESS FOR THE PREPARATION OF CHLORINE SUBSTITUTED BUTANES

Johann Sixt, Munich, Germany, assignor to Consortium Fuer Elektrochemische Industrie, G. m. b. H., Munich, Germany, a corporation of Germany No Drawing. Application May 7, 1936, Serial No. 78,403. In Germany June 19, 1935

12 Claims. (Cl. 260—162)

This invention relates to a process for the preparation of chlorine substituted butanes.

I have found that chlorine substituted butanes can be obtained in good yield by the treatment of 1,1-dichlorethane with chlorine substituted ethylene using aluminium chloride as a catalyst.

During the carrying out of the reaction the temperature is preferably kept low in order to prevent the reaction proceeding beyond the point desired, and more particularly preventing the formation of resins. I prefer in the preparation to use the 1,1-dichlorethane in excess.

Various methods will now be given by way of example for carrying out the preparation of chlorine substituted butanes in accordance with the present invention, but the invention is not limited to the details given therein.

Example 1

400 parts 1,1-dichlorethane were treated with 16 parts of finely powdered aluminium chloride, and 180 parts of vinyl-chloride were introduced with stirring and sufficient cooling to maintain the temperature at about 20° C. After the reaction had proceeded for 3 hours the aluminium chloride was dissolved in aqueous hydrochloric acid and the vinyl chloride and the unchanged 1,1-dichlorethane fractionated off from the mixture of chlorinated hydrocarbons. The trichlorbutane ($C_4H_7Cl_3$) obtained then passed over at 150° C. under a pressure of 720 mm. with a yield of 85% calculated on the vinyl chloride used.

Example 2

100 parts of 1,1-dichlorethane were stirred for one hour with 60 parts of symmetrical dichlorethylene (boiling point 60° C.) and 3 parts finely divided aluminium chloride. Hydrochloric acid was added and the chlorinated hydrocarbons were fractionated. The tetrachlorbutane ($C_4H_6Cl_4$) obtained passed over at a temperature of 180°–190° C. under a pressure of 720 mm. The yield amounted to 80% calculated on the dichlorethylene used. There was only a slight formation of resinous products.

Example 3

60 grams of trichlorethylene and 100 grams of 1,1-dichlorethane were treated with 3 grams of aluminium chloride in the manner described in Example 2. The resulting pentachlorbutane ($C_4H_5Cl_5$) distilled over undecomposed at about 200° C. under ordinary pressure.

The chlorinated butanes thus obtained can be used as solvents: alternatively they may be saponified with alkalies or converted by treatment with zinc into compounds poorer in chlorine or free from chlorine.

I claim as my invention:

1. Process for the manufacture of chlorine substituted butanes wherein 1,1-dichlorethane is treated with chlorine substituted ethylenes in the presence of aluminium chloride.

2. Process for the manufacture of trichlorbutane wherein 1,1-dichlorethane is treated with vinyl-chloride in the presence of aluminium chloride.

3. Process for the manufacture of tetrachlorbutane wherein 1,1-dichlorethane is treated with symmetrical dichlorethylene in the presence of aluminium chloride.

4. Process for the manufacture of pentachlorbutane wherein 1,1-dichlorethane is treated with trichlorethylene in the presence of aluminium chloride.

5. Process for the manufacture of chlorine substituted butanes wherein 1,1-dichlorethane is treated with chlorine substituted ethylenes in the presence of aluminium chloride at a temperature below 60° C.

6. Process for the manufacture of trichlor-butane wherein 1,1-dichlorethane is treated with vinyl-chloride in the presence of aluminium chloride at a temperature below 60° C.

7. Process for the manufacture of tetrachlorbutane wherein 1,1-dichlorethane is treated with symmetrical dichlorethylene in the presence of aluminium chloride at a temperature below 60° C.

8. Process for the manufacture of pentachlorbutane wherein 1,1-dichlorethane is treated with trichlorethylene in the presence of aluminium chloride at a temperature below 60° C.

9. Process for the manufacture of chlorine substituted butanes wherein 1,1-dichlorethane is treated with chlorine substituted ethylenes in the presence of aluminium chloride and an excess of 1,1-dichlorethane is employed.

10. Process for the manufacture of trichlorbutane wherein 1,1-dichlorethane is treated with vinyl-chloride in the presence of aluminium chloride and an excess of 1,1-dichlorethane is employed.

11. Process for the manufacture of tetrachlorbutane wherein 1,1-dichlorethane is treated with symmetrical dichlorethylene in the presence of aluminium chloride and an excess of 1,1-dichlorethane is employed.

12. Process for the manufacture of pentachlorbutane wherein 1,1-dichlorethane is treated with trichlorethylene in the presence of aluminium chloride and an excess of 1,1-dichlorethane is employed.

JOHANN SIXT.